United States Patent

Krupka

[15] 3,649,905
[45] Mar. 14, 1972

[54] TRUE RMS VOLTAGE REGULATOR

[72] Inventor: Ronnie W. Krupka, Richardson, Tex.

[73] Assignee: Electronic Control Corporation, Euless, Tex.

[22] Filed: Feb. 12, 1970

[21] Appl. No.: 10,910

[52] U.S. Cl. .............................. 323/22 SC, 323/24, 323/38, 323/69
[51] Int. Cl. ......................................................... G05f 1/44
[58] Field of Search ................... 323/16, 19, 22 SC, 24, 38, 323/68, 69

[56] References Cited

UNITED STATES PATENTS 3,300,622   1/1967   Swain ............................... 323/22 SC
3,465,237   9/1969   Brookmire ......................... 323/22 SC
3,466,572   9/1969   Hanna et al. ....................... 323/68 UX

*Primary Examiner*—A. D. Pellinen
*Attorney*—Giles C. Clegg, Jr. and Peter J. Murphy

[57] ABSTRACT

A heater resistor is connected in parallel with the load voltage to be regulated. A first temperature-responsive resistor is mounted in intimate thermal contact with the heater resistor and a second heat-responsive resistor is mounted in intimate thermal contact with the ambient temperature. The resistance ratio of the two heat-responsive resistors is compared to a reference resistance ratio in a comparator circuit and the resulting error signal is applied to a trigger timing circuit that controls the firing time of a semiconductor switching device in series with the AC voltage supply and the load.

16 Claims, 2 Drawing Figures

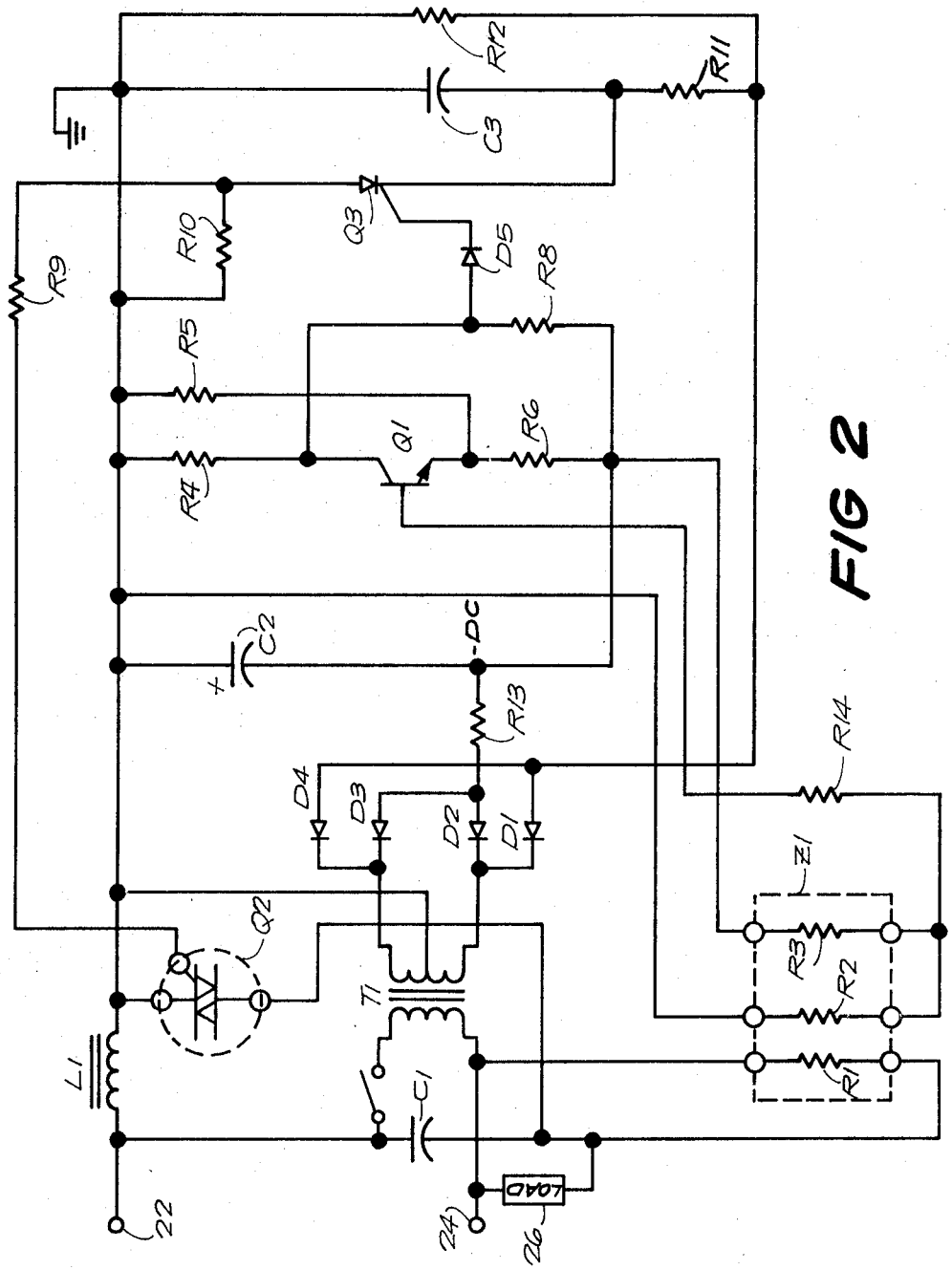

TRUE RMS VOLTAGE REGULATOR

BACKGROUND OF THE INVENTION

Many different types of voltage regulator circuits have been devised in the past to stabilize the level of an AC voltage with respect to variations in the AC supply voltage or the load impedance, but although these circuits all performed their intended function, they suffered from several disadvantages due to the fact that their operation has been based upon the peak or average value of the AC voltage rather than its RMS value. The RMS value of an AC voltage is its effective value as opposed to its peak or average values and is defined as the DC voltage level that will produce the same heating effect in a resistive load. Since the heat developed in a resistive load is equal to $I^2R$ or to $E^2/R$, the effective value of an AC voltage can be calculated mathematically by integrating $I^2$ or $E^2$ over one full cycle of the AC waveform, dividing by the time period of the cycle to determine the mean value of the squared function, and then taking the square root of the mean value of the squared function. Although the value determined by this calculation is defined as the effective value of voltage as opposed to its peak or average value, it has become known as the root mean square or RMS value due to the mathematical operations by which it is calculated.

In a sinisoidal waveform, the RMS value of the voltage is equal to 0.707 times the peak voltage, and this relationship is frequently used as a basis for measuring the RMS value of the voltage. It should be understood, however, that such measurements are only approximations and do not represent the true RMS value. The reason that such measurements are approximations is that they are dependent on a perfect waveform, and since perfect waveforms cannot be achieved in practice, such measurements contain inherent inaccuracies due to normal variations in the AC waveform.

Since the RMS value of an AC voltage varies as a square function of its waveform, while the average value varies as a linear function of waveform, and the peak value is independent of waveform, it will be clear that regulators whose operation is based on the average or peak value of an AC voltage will suffer from inaccuracies due to variations in the power supply waveform, and it will also be clear that such regulators are dependent on waveform and cannot be used in connection with AC voltages that have an irregular waveform. Accordingly, it is a principle object of this invention to provide an AC voltage regular whose operation is based on the true RMS value of an AC voltage independent of its waveform. It is an additional object of this invention to provide an extremely accurate AC voltage regular which is simple in structure, small in size, and highly reliable in operation.

SUMMARY OF THE INVENTION

In accordance with this invention, the above noted objects are achieved by a voltage regular circuit in which the true RMS value of an AC voltage is determined by a heater resistor, a first temperature-responsive resistance mounted in intimate thermal contact with the heater resistor. A second temperature-responsive resistor mounted in intimate thermal contact with the ambient temperature and insulator means separating the heater resistor and first temperature-responsive resistor from the second temperature-responsive resistor is preferably provided for obtaining temperature compensation. The first and second temperature-responsive resistors have the same or opposite temperature coefficients of resistance. The heater resistor is coupled in parallel with the load and is therefore heated by the voltage applied across the load to a temperature which is proportional to the true RMS voltage across the load. The heat from the heater resistor is transmitted to the first temperature-responsive resistor, whose resistance varies as a substantially linear function of temperature within a temperature range corresponding to the range of AC voltages to be measured. The resistance of the second temperature-responsive resistor also varies as a linear function of temperature, but since it is in intimate thermal contact with the ambient temperature and insulated from the heater resistor, its resistance value will be proportional to the ambient temperature. Therefore, the resistance ratio between the first and second temperature responsive resistors is an indication of the amount of heat generated in the heater resistor, which in turn is proportional to the true RMS value of the AC voltage across the load and compensated for variations in ambient temperature.

Preferably, the above noted resistance ratio is compared to a reference resistance in a comparator circuit whose output is an error signal that is proportional to the deviation of the resistance ratio from a predetermined level that corresponds to a desired value of true RMS voltage across the load. However, other means for generating an error signal as a function of changes in the resistance of the first heat-responsive resistor can be used. The error signal is applied to a trigger timing circuit that controls the firing time of a semiconductive switching device in series with the load. The semiconductive switching device controls the time duration during the AC power cycle that voltage is applied across the load and thus controls the true RMS voltage applied thereto. The trigger timing circuit shortens the time duration of the applied voltage when the error signal indicates a rise in the true RMS voltage across the load, and lengthens the time duration of the applied voltage when the error signal indicates a drop in the true RMS voltage across the load, thereby holding the true RMS value of the voltage across the load at a constant value in spite of variations in the AC supply voltage or the load impedance.

DESCRIPTION OF THE DRAWINGS

FIG. 2 is a schematic circuit diagram of a second embodiment of the invention.

DETAILED DESCRIPTION OF THE INVENTION

Figure 1:
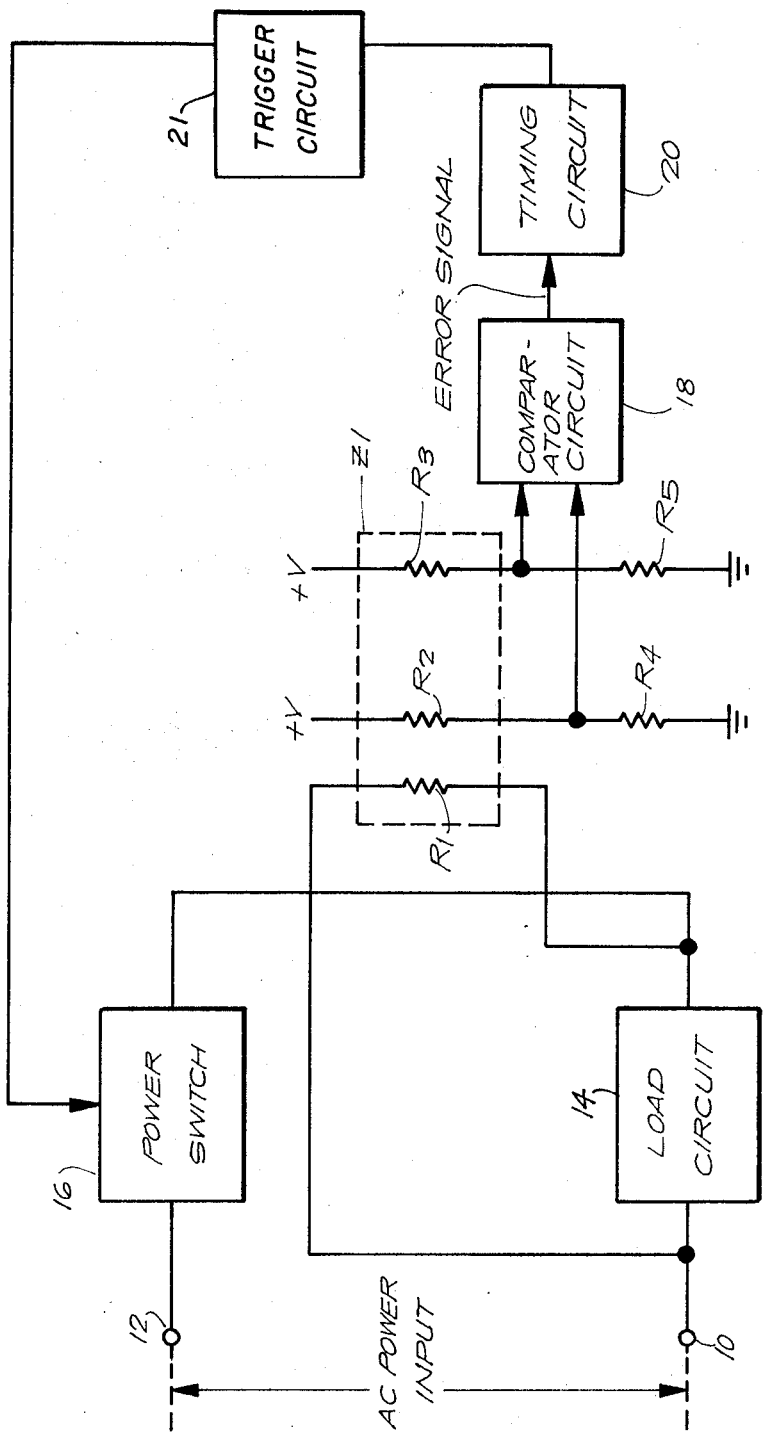
FIG. 1 is a block diagram of a first embodiment of the invention.

FIG. 1 is a block diagram of one illustrative embodiment of the invention. Referring to FIG. 1, an AC power supply voltage is applied between input terminals 10 and 12 and coupled to a load 14 through a power switch 16 which comprises a silicon controlled rectifier, a bilateral semiconductor switching device, or some other suitable fast-acting semiconductor switch. The time in the power cycle at which the power switch 16 will be closed is determined by the timing of a gate input signal. By appropriate variation of the time at which the gate terminal of power switch 16 is triggered, the firing angle of the power switch can be varied so as to maintain the true RMS value of the AC voltage applied to load 14 within a desired voltage range.

The true RMS voltage across load 14 is sensed by a true RMS voltage sensor comprising a heater resistor $R_1$, a first temperature-responsive resistor $R_2$ mounted in intimate thermal contact with the heater resistor $R_1$, and a second heat-responsive resistor $R_3$, mounted in intimate thermal contact with the ambient temperature but insulated from the heater resistor $R_1$ and first temperature responsive resistor $R_2$. Heater resistor $R_1$ is heated by the AC voltage applied across load 14 to a temperature which is proportional to the true RMS value of the voltage thereacross. The heat developed in heater resistor $R_1$ is transmitted to first temperature-responsive resistor $R_2$, whose resistance varies as a substantially linear function of temperature within a temperature range corresponding to the AC voltage range to be sensed. The second temperature responsive resistor $R_3$ has a temperature coefficient of resistance the same as or opposite to resistor $R_2$. The resistance of resistor $R_3$ also varies as a linear function of temperature, but since it is in intimate thermal contact with the ambient temperature and insulated from resistors $R_1$ and $R_2$, its resistance will be influenced to a much greater extent by the ambient temperature rather than to the temperature of heater resistor $R_1$. Under these circumstances, the ratio between resistors $R_2$ and $R_3$ will be proportional to the amount of heat developed in heater resistor $R_1$ compensated for variations in ambient temperature, which in turn is proportional to the true RMS voltage across load 14. Accordingly, the resistance ratio between resistors $R_2$ and $R_3$ is an indicator of the true RMS voltage across load 14. It is important to note that resistor $R_3$ is not required if the ambient temperature is stable or if maximum accuracy is not required.

The detailed structure and design considerations involved in the above-noted true RMS voltage sensor will not be disclosed herein since they are disclosed in detail in my copending application Ser. No. 5,671 which was filed on Jan. 26, 1970 for a "RMS Voltage Or Current Sensor."

The first temperature-responsive resistor $R_2$ is connected in series with another resistor $R_4$ between a source of DC voltage +V and ground. The second temperature-responsive resistor $R_3$ having the same temperature coefficient of resistance as resistor $R_2$ is coupled in series with a similar resistor $R_5$ between a source of voltage +V and ground. Resistors $R_2$, $R_3$, $R_4$, and $R_5$ thus form an impedance bridge. Resistors $R_4$ and $R_5$ preferably have the same temperature coefficient resistance. In this circuit configuration, the voltage appearing at the junction between $R_2$ and $R_4$ will be proportional to the resistance of resistor $R_2$, and the voltage appearing at the junction between $R_3$ and $R_5$ will be proportional to the resistance of resistor $R_3$. These two voltages are applied to a comparator circuit 18 which produces an output signal that indicates the deviation between the resistance ratio of resistors $R_2$ and $R_3$ from a predetermined reference resistor ratio corresponding to the desired value of RMS voltage across load 14.

The output of comparator circuit 18 is an error signal which indicates the deviation of the true RMS voltage applied across load circuit 14 from a predetermined desired level. This error signal is applied to the input of a trigger timing circuit 20 which controls the operation of a trigger circuit 21. Timing circuit 20 actuates trigger circuit 21 once during each half-cycle of the power supply voltage at a point in time that varies in accordance with the input signal to timing circuit 20. When the error signal output from comparator circuit 18 indicates a drop in the true RMS voltage across load circuit 14, timing circuit 20 varies the timing of trigger circuit 21 to cause an increase of the time duration in the power cycle during which voltage is applied to load circuit 14, thus increasing the true RMS voltage applied across the load to compensate for the drop in voltage. When the error signal output from comparator circuit 18 indicates a rise in the true RMS voltage across load circuit 14, timing circuit 20 varies the timing of trigger circuit 21 to cause a decrease in the time duration in the power cycle during which voltage is applied to load circuit 14, thus decreasing the true RMS voltage applied across the load to compensate for the rise in voltage. In this way, the true RMS voltage applied across load circuit 14 is held constant at a predetermined level in spite of variations in the power supply voltage or in the load impedance.

FIG. 2 shows the complete schematic circuit diagram for a second embodiment of the invention. In this embodiment of the invention, the AC power input is applied between terminals 22 and 24. A load circuit 26, a bilateral semiconductor switching device $Q_2$ and an inductor $L_1$ are connected together in series between the AC input terminals 22 and 24. A capacitor $C_1$ is connected in parallel with inductor $L_1$ and semiconductor switching device $Q_2$. Inductor $L_1$ and capacitor $C_1$ function as a filter to reduce high frequency harmonics produced as the device $Q_2$ switches on. The primary of a power supply transformer $T_1$ is also connected between the AC input terminals 22 and 24 along with a switch 30 for turning the power off and on at the primary winding of transformer $T_1$.

Before discussing the operation of the voltage regulator per se, the DC power supply will first be discussed. The secondary winding of transformer $T_1$ is coupled to semiconductor diodes $D_1$, $D_2$, $D_3$, and $D_4$ which are connected to comprise two different full wave rectifier circuits, the first of which is coupled through filter resistor $R_{13}$ and filter capacitor $C_2$ to provide DC supply potential for transistor $Q_1$, and the second of which is applied across resistor $R_{11}$ and capacitor $C_3$. Resistor $R_{12}$ is a bleed resistor and not required in all instances. The voltage developed across capacitor $C_3$ is a ramp voltage which is applied to silicon-controlled rectifier $Q_3$. Silicon-controlled rectifier $Q_3$ is utilized in the trigger timing circuit for semiconductor switching device $Q_2$ as will be described later.

This embodiment of the invention utilizes a true RMS voltage sensor $Z_1$ of the type described having a heater resistor $R_1$, a first temperature-responsive resistor $R_2$, and a second temperature-responsive resistor $R_3$, resistors $R_2$ and $R_3$ having the same temperature coefficient of resistance. The heater resistor $R_1$ is coupled in parallel with load 26 and the two temperature-responsive resistors $R_2$ and $R_3$ are coupled together in series between the positive and negative DC voltage appearing across filter capacitor $C_2$.

The junction between the two temperature-responsive resistors $R_2$ and $R_3$ is applied through resistor $R_{14}$ to the base of transistor $Q_1$ where it is compared to a reference level determined by the voltage divider network $R_5$ and $R_6$. The deviation of the resistance ratio of $R_2$ and $R_3$ from that of $R_5$ and $R_6$ appears as an error output signal across collector resistor $R_4$ and is applied through diode $D_5$ to the gate terminal of silicon controlled rectifier (SCR) $Q_3$. A negative going ramp voltage is applied across the anode cathode circuit of silicon-controlled rectifier $Q_3$. This negative going ramp is generated by integrating capacitor $C_3$ and resistor $R_{11}$ from the negative going, pulsating DC output of power supply diodes $D_1$ and $D_4$. When the negative going ramp voltage becomes more negative than the voltages across $R_4$ by an amount sufficient to forward bias diode $D_5$ and the gate-cathode diode of silicon controlled rectifier $Q_3$, the rectifier $Q_3$ will switch to the low impedance state. It will be apparent to those skilled in the art that the time in the power supply cycle at which silicon controlled rectifier $Q_3$ will switch on is determined by the error output developed at the collector of transistor $Q_1$. Thus a variation, in the error signal developed at the collector of transistor $Q_1$ will produce a variation in the time at which silicon controlled rectifier $Q_3$ switches on with respect to the AC cycle of the power input. The anode of silicon-controlled rectifier $Q_3$ is coupled through resistor $R_9$ to the gate terminal of bilateral semiconductor switching devices $Q_2$. Therefore, when silicon controlled rectifier $Q_3$ turns on each half cycle, a negative going pulse is applied to turn on the bilateral semiconductor switch $Q_2$ at the same time.

In term of overall operation, a variation of the true RMS voltage applied across load 26 causes a variation in the temperature of the heater resistor $R_1$, which causes a corresponding variation in the ratio between resistors $R_2$ and $R_3$, which causes a corresponding variation in the error output signal from the collector of transistor $Q_1$, which causes a corresponding variation in the time at which silicon-controlled rectifier fires, which in turn causes a corresponding variation in the conduction time of the bilateral semiconductor switch $Q_2$, which controls the amount of time during which voltage is applied to the load 26 and thus controls the true RMS value of the voltage applied thereacross.

Although this invention has been described in connection with several specific embodiments thereof, it should be understood that the invention is by no means limited to the disclosed embodiments, since many modifications can be made in the disclosed embodiments without departing from the basic principles of the invention. For example, if the temperature-responsive resistors $R_2$ and $R_3$ have sufficiently high temperature coefficients of resistance, no amplifier may be needed, depending on the degree of amplification required. The resistor $R_6$ could be replaced by a Zener diode if desired, and resistor $R_{11}$ could be replaced by a constant-current reference diode to produce a more linear ramp, or a bootstrap circuit could be employed to produce a more linear ramp. If sensor $Z_1$ is maintained at a sufficiently stable ambient temperature, resistor R does not necessarily have to be a part of the sensor nor must the temperature coefficients of resistance of $R_2$ and $R_3$ be the same or opposite. These and many other modifications of the disclosed circuit will be apparent to those skilled in the art, and this invention includes all modifications falling within the scope of the following claims.

What is claimed is:

1. A voltage regulator for regulating the true rms value of an AC voltage applied across a load, comprising a switching device having at least two main current-carrying terminals and a gate terminal, said switching device being operable when triggered by a signal applied to said gate terminal thereof to conduct current between said two main current-carrying terminals thereof as long as voltage applied between said two main current carrying terminals is above a predetermined extinguishing voltage level, means for connecting the two main current-carrying terminals of said switching device in series with said load and a source of AC voltage, a heater resistor, means for connecting said heater resistor in parallel with said load, a first temperature-responsive resistor in intimate thermal contact with the heater resistor, means for thermally separating said heater resistor and said first temperature-responsive resistor from the surrounding ambient temperature whereby the resistance of said first temperature-responsive resistor is a function of the amount of heat generated by said heater resistor, which in turn is proportional to the deviation of the resistance of said first resistor from a predetermined reference level, error signal generating means for generating an error signal proportional to the deviation of the resistance of the first resistor from a predetermined reference level, and control means for triggering the switching device at least once during each cycle of said AC voltage and for controlling the time at which said switching device is triggered to compensate for variation in the true rms value of the AC voltage applied across said load including a silicon controlled rectifier having two main current-carrying terminals and a gate terminal, means for generating a ramp voltage which is synchronized with said AC voltage, means for coupling said ramp voltage across said two main current carrying terminals of said silicon-controlled rectifier, means for coupling one of said two main current-carrying terminals of said silicon-controlled rectifier to the gate terminal of said switching device, and means for coupling said error signal to the gate terminal of said silicon controlled rectifier.

2. A voltage regulator as defined in claim 1 wherein said control means is operable to retard the firing time of said switching device in response to a rise in the true RMS value of the AC voltage across said load and to advance the firing time of said switching device in response to a drop in the true RMS value of the AC voltage across said load.

3. A voltage regulator as defined in claim 1 including a second temperature-responsive resistor in intimate thermal contact with the ambient temperature but thermally insulated from the heater resistor and the first temperature-responsive resistor and wherein said error signal generating means comprises comparator means for comparing the resistance ratio of said first and second resistors to a predetermined reference level which is proportional to the resistance ratio that corresponds to a desired value of true RMS voltage across said load.

4. A voltage regulator as defined in claim 3 wherein said first resistor has a substantially linear temperature coefficient of resistance within a temperature range corresponding to a desired range of true RMS voltages to be sensed, and wherein said second resistor has a substantially linear temperature coefficient of resistance the same or opposite to that of the first resistance within a temperature range corresponding to a desired range of ambient temperatures.

5. A voltage regulator as defined in claim 3 wherein said error signal generating means comprises an impedance bridge including said first and second temperature responsive resistors.

6. A voltage regulator as defined in claim 1 wherein said first and second resistors are coupled to a source of DC voltage for developing a voltage thereacross proportional to the resistance thereof, and wherein said comparator circuit comprises means for comparing the ratio of voltage across said first and second temperature responsive resistors to a reference voltage which is proportional to the resistance ratio that corresponds to a desired value of true RMS voltage across said load and for generating an error signal proportional to the deviation of the actual ratio voltage from the desired ratio voltage.

7. A voltage regulator as defined in claim 1 wherein said means for generating a ramp voltage comprises a full-wave rectifier coupled to said AC voltage and an integrating capacitor and resistor coupled in series across the output of said full wave rectifier.

8. A voltage regulator as defined in claim 7 wherein said comparator circuit comprises a transistor having base, collector, and emitter electrodes, said first and second temperature-responsive resistors being coupled together in series across the output of a DC voltage source, means coupling the junction of said first and second temperature-responsive resistors to the base of said transistor, means coupling said reference voltage to one of the other two terminals of said transistor, and an output resistor coupled to the remaining terminal of said transistor.

9. A voltage regulator as defined in claim 8 wherein said DC voltage source comprises a second full wave rectifier coupled to said AC voltage and a filter circuit coupled across the output of said second full wave rectifier.

10. A voltage regulator as defined in claim 9 wherein said reference voltage is generated by a voltage divider coupled across the output of said DC voltage source, said voltage divider having a predetermined ratio providing a reference voltage that corresponds to a desired value of true RMS voltage across said load.

11. A voltage regulator as defined in claim 10 and further comprising an inductor coupled in series with said switching device and a capacitor coupled in parallel with said switching device and said inductor.

12. A voltage regulator for regulating the true rms value of an AC voltage applied across a load, comprising a switching device having at least two main current carrying terminals and a gate terminal, said switching device being operable when triggered by a signal applied to said gate terminal thereof to conduct current between said two main current carrying terminals thereof as long as voltage applied between said two main current carrying terminals is above a predetermined extinguishing voltage level, means for connecting the two main current-carrying terminals of said switching device in series with said load and a source of AC voltage, a heater resistor, means for connecting said heater resistor in parallel with said load, a first temperature responsive resistor in intimate thermal contact with the heater resistor, means for thermally separating said heater resistor and said first temperature-responsive resistor from the surrounding ambient temperature whereby the resistance of the first temperature-responsive resistor is a function of the amount of heat generated by said heater resistor, which in turn is proportional to the deviation of the resistance of said first resistor from a predetermined reference level, a second temperature-responsive resistor in intimate thermal contact with the ambient temperature thermally insulated from the heater resistor and the first temperature responsive resistor, an error signal generating means including comparator means for comparing the resistance ratio of the first and second resistors to a predetermined reference level which is proportional to the resistance ratio that corresponds to a desired value of true RMS voltage across the load for generating an error signal proportional to the deviation of the resistance of the first resistor from a predetermined reference level, trigger means coupled to the gate terminal of said switching device for triggering the switching device at least once during each cycle of said AC voltage, and timing means coupled between said error signal generating means and said trigger means for controlling the time at which said switching device is triggered to compensate for variations in the true RMS value of the AC voltage applied across said load by retarding the firing time of said switching device in response to a rise in the true rms value of AC voltage across the load and advancing the firing time of said switching device in response to a drop in the true rms value of the AC voltage across said load.

13. A voltage regulator as defined in claim 12 wherein said comparator circuit comprises a transistor having base, collector, and emitter electrodes, said first and second temperature-responsive resistors being coupled together in series across the output of a DC voltage source, means coupling the junction of said first and second temperature-responsive resistors to the base of said transistor, means coupling said reference voltage to one of the other two terminals of said transistor, and an output resistor coupled to the remaining terminal of said transistor.

14. A voltage divider as defined in claim 13 wherein said reference voltage is generated by a voltage divider coupled across the output of said DC voltage source, said voltage divider having a predetermined resistance ratio providing a reference voltage that corresponds to a desired value of true RMS voltage across said load.

15. A voltage divider as defined in claim 12 wherein said first resistor has a substantially linear temperature coefficient of resistance within a temperature range corresponding to a desired range of true rms voltages to be sensed, wherein said second temperature responsive resistor has a substantially linear temperature coefficient of resistance the same or opposite to that of the first resistor within a temperature range corresponding to a desired range of ambient temperatures.

16. A voltage regulator as defined in claim 12 wherein said error signal generating means comprises an impedance bridge including said first and second temperature responsive resistors.

* * * * *